United States Patent [19]
Niederer, deceased et al.

[11] 3,848,730

[45] Nov. 19, 1974

[54] EGG WASHER

[76] Inventors: Otto C. Niederer, deceased, late of Bear Tavern Rd., Titusville, N.J. 08560; Thomas O. Niederer; Dennis A. Niederer, executors, both of Bear Tavern Rd., Titusville, N.J. 08560

[22] Filed: Mar. 8, 1972

[21] Appl. No.: 232,693

[52] U.S. Cl. ................................. 198/183, 15/308
[51] Int. Cl............................................ B65g 15/00
[58] Field of Search ........... 198/129, 131, 184, 193, 198/198, 183, 127; 15/308

[56] References Cited
UNITED STATES PATENTS

| | | | |
|---|---|---|---|
| 2,647,618 | 8/1953 | McLachlan | 198/192 R |
| 2,776,528 | 1/1957 | Niederer | 198/198 |
| 3,068,785 | 12/1962 | Ahlburg | 198/183 |
| 3,127,972 | 4/1964 | Rabinow | 198/1 |
| 3,155,102 | 11/1964 | Niederer | 198/33 AA |
| 3,252,561 | 5/1966 | Kelton | 198/183 |

FOREIGN PATENTS OR APPLICATIONS

| | | | |
|---|---|---|---|
| 1,561,534 | 2/1969 | France | 198/127 R |

*Primary Examiner*—Richard E. Aegerter
*Attorney, Agent, or Firm*—Sperry and Zoda

[57] ABSTRACT

Egg washing and other egg handling equipment is provided with a conveyor embodying a plurality of parallel transversely extending rods having radially extending egg supporting fins mounted thereon and extending in planes parallel to the direction of movement of the conveyor. The fins vary in diameter and are arranged to define egg receiving recesses in which the eggs can be supported during movement of the conveyor. The fins supporting the eggs are spaced apart a sufficient distance to permit washing liquid and air to pass freely through the conveyor without materially obstructing or reducing the rate of flow of air and liquid over and about the eggs and through the conveyor. At the same time the limited area of contact between the eggs and the fins by which they are supported overcomes the tendency for liquid to be reapplied to the eggs or spread over the surfaces of the eggs upon rotation of the egg supporting fins.

3 Claims, 5 Drawing Figures

PATENTED NOV 19 1974 3,848,730
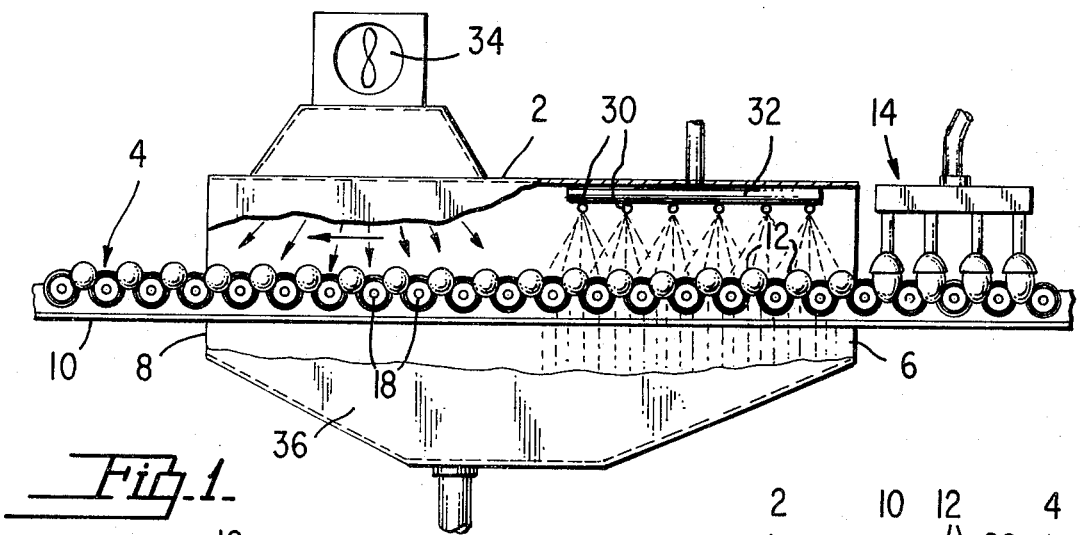
Fig. 1.
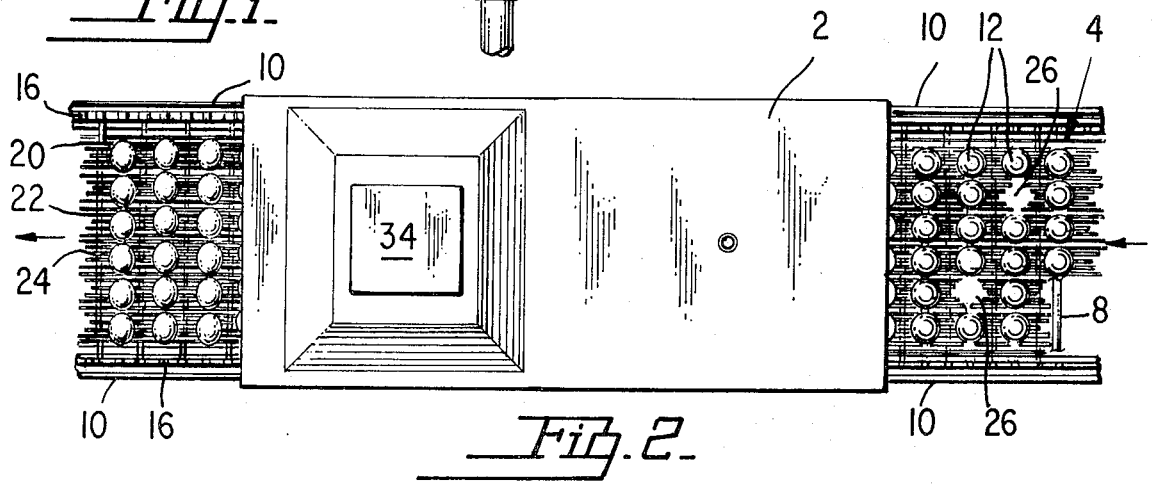
Fig. 2.
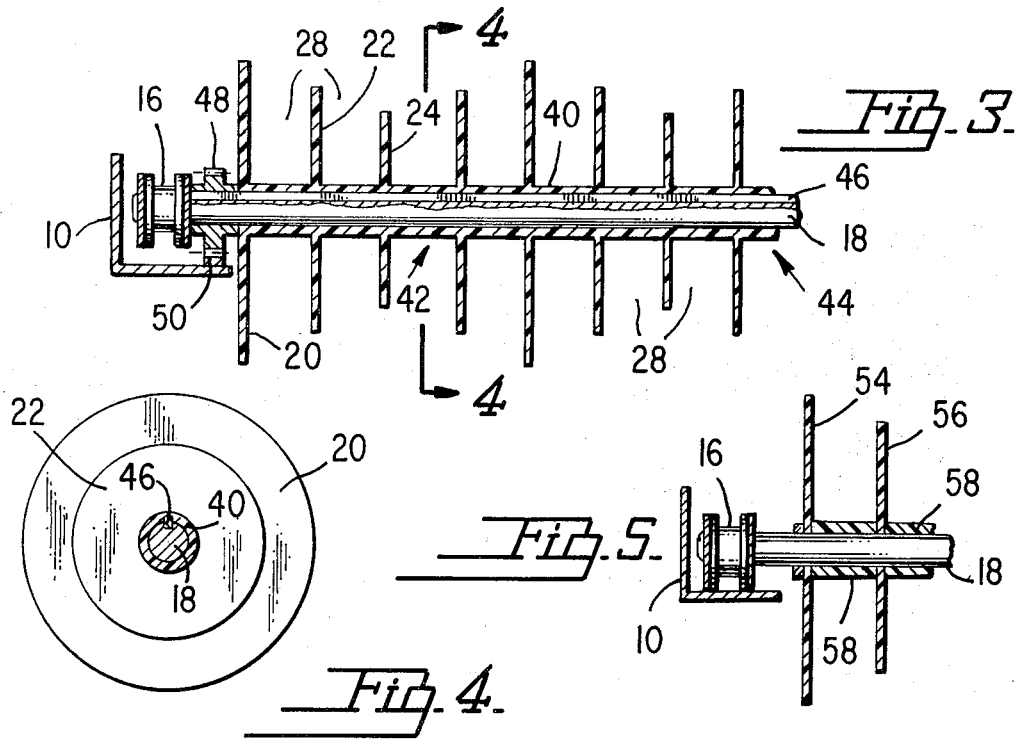
Fig. 3.
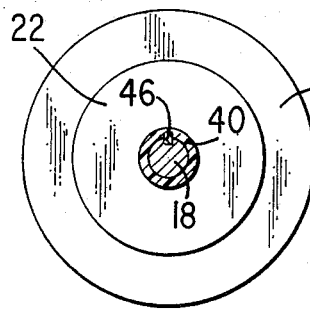
Fig. 4.
Fig. 5.

3,848,730

EGG WASHER

FIELD OF INVENTION

It is common practice in the handling and preparation of eggs for market to subject the eggs to a washing or scrubbing operation. For this purpose they are supported on a conveyor and moved past sprays or jets of washing liquid and thereafter subjected to a current of air for drying the eggs. Typical equipment of this type is shown in U.S. Pat. Nos. 3,049,135 and 3,349,419.

It has also been suggested that the conveyors used in egg washing and other egg handling equipment may embody parallel chains movable along supports with rods extending transversely of the conveyor between the chains and surrounded by coiled spring means which serve to support the eggs in a yielding manner as shown in U.S. Pat. No. 3,428,162. As further shown in U.S. Pat. Nos. 3,148,761 and 3,155,102 such coiled spring means may be formed and positioned to define egg receiving recesses in which the eggs are arranged in predetermined locations on the conveyor. Moreover, the coiled spring members may be rotated to rotate the eggs supported thereon.

It has now been found that conveyors for use in egg washers and elsewhere can be provided with parallel chains and transversely extending rods having radially extending egg supporting fins mounted on the rods and located in planes extending parallel to the direction of movement of the conveyor. Such fins may be relatively thin and spaced apart so as to occupy a very limited area and present free unobstructed spaced therebetween through which washing liquid and air may flow readily without creating any material restriction or back pressure. Moreover, the fins are preferably circular in shape or in the form of discs which present a very limited area of contact between the fins and the eggs supported thereby and as a result very little if any spreading or reapplication of liquid to the surface of the eggs will occur upon rotation of the fins. The fins also may vary in size or diameter to cooperate with the fins carried by an adjacent rod to define egg receiving cavities or recesses for holding the eggs in a predetermined arrangement on the conveyor during the washing or other operation.

THE DRAWING

FIG. 1 is a longitudinal sectional view through typical egg handling equipment embodying the present invention;

FIG. 2 is a top plan view of a portion of the conveyor employed in the equipment of FIG. 1;

FIG. 3 is an enlarged sectional view through a portion of the conveyor embodied in the equipment of FIGS. 1 and 2;

FIG. 4 is a sectional view taken on the line 4—4 of FIG. 3, and;

FIG. 5 is a view similar to FIG. 3 illustrating an alternative construction embodying the present invention.

PREFERRED EMBODIMENTS OF THE INVENTION

In that form of the invention chosen for purposes of illustration in FIGS. 1 to 4 the egg handling equipment is illustrated as an egg washer having a chamber 2 through which a conveyor 4 is moved longitudinally from the inlet end 6 to the outlet end 8 of the chamber 2 along supports 10 at opposite sides of the chamber. The eggs 12 to be washed may be deposited on the conveyor 4 by any suitable means such as the vacuum egg lifter device 14 or the like.

The conveyor 4 embodies parallel chains 16 located at opposite sides of the conveyor which rest upon the supports 10. Rods 18 extend transversely of the conveyor and are arranged in parallel relation. Each rod 18 has a plurality of parallel egg supporting fins 20, 22, 24, etc. spaced apart longitudinally of the rods 18 and projecting radially outward from the rods in planes extending parallel to the direction of movement of the conveyor. The egg supporting fins 20, 22, 24, etc. are preferably in the form of discs and are similarly arranged on adjacent rods 18 so that the largest disc 20 on one rod is aligned with the largest disc 20 on an adjacent rod, the intermediate size disc 22 on each rod is aligned with a disc 22 of similar diameter on the adjacent rods, and the smallest discs 24 on the various rods are aligned in planes extending longitudinally of the conveyor. In this way the fins on the adjacent rods cooperate to define egg receiving recesses 26 on the conveyor in which the eggs 12 can be arranged in spaced and predetermined relation.

The radially extending fins 20, 22 and 24 are relatively thin and spaced a sufficient distance apart to provide the major area of the conveyor with passages 28 through which cleaning liquid, air or other fluids may pass freely and without appreciable obstruction. The eggs 12 supported on the conveyor can then be passed through the chamber 2 and beneath sprays or jets of washing liquid projected downward from nozzles 30 supplied with washing liquid from a pipe 32 or other source. Further as the conveyor and eggs move on past the spray devices toward the outlet end 8 of the chamber 2 they pass beneath a blower or other air discharge means 34 by which air, which may be heated, is directed downwardly over the washed eggs.

The washing liquid and air directed onto the eggs can then flow downward over the eggs and through the conveyor without substantial obstruction or interference from the conveyor and into the lower portion 36 of the chamber 2. As a result there will be no accumulation of liquid on the conveyor and negligible back pressure opposing the flow of air through the conveyor. Moreover, the direction of flow of the air is parallel to the surfaces of the discs so that it serves to sweep the droplets of liquid across the surfaces and off the fins into the lower portion 36 of the chamber. Furthermore, since the fins are relatively thin their area of contact with the eggs is limited and there is little or no tendency for liquid to be held in contact with the eggs.

The number of fins provided and the spacing thereof can of course be varied. They can be formed of any suitable material and be supported on the rods 18 in any suitable way. As shown in FIG. 3 the fins 20, 22 and 24 may be formed integral with a central tubular element 40 of a spool-like member 42. Several such spool-like members may be mounted on each rod if desired and each member may be designed to receive and support a single egg as represented by the members 42 and 44. Such members can be readily formed of molded plastic material such as polyethylene, polystyrene, "Teflon" or the like to which the washing liquid will not adhere readily. Further as shown in FIGS. 3 and 4 the spool-like members may be secured to the rods 18 by means of a key 46 or the like and the rods with their members and fins may be rotated by suitable means such as a gear 48 engageable with a rack 50 extending along the support 10 along which the chain 16 is moved. In this way the eggs supported on the conveyor can be rotated to present the entire surface thereof to the jets of washing liquid and to the air blast from blower 34 so as to more effectively clean and dry the eggs as they are moved through the chamber 2.

In the alternative assembly of FIG. 5 the rods and fins of the conveyor are provdied with separately formed fins 54, 56 etc. and may be in the form of plastic, metal or other discs which directly engage the rods 18 and are held in spaced relation by spacing elements 58 or the like. The spacing of the discs can then be varied as desired by employing spacers of any selected length.

While the construction shown and described is particularly adapted for use in egg washing equipment it may also be employed in other types of egg handling equipment. Thus, conveyors of the type herein shown and described are of advantage when used in egg candling equipment where it is desired to permit a maximum amount of light to pass through the conveyor to the eggs being candled. However, the construction also can be used for supporting and moving eggs being supplied to egg orienting, egg packing and egg grading equipment or the like or wherever it is desired to move eggs in an orderly or predetermined arrangement to or from any egg handling equipment.

For the foregoing reasons it will be apparent that the present invention is capable of numerous changes in the form, construction and arrangement of the various elements of the combination. In view thereof it should be understood that the particular embodiments of the invention which are shown in the drawing and described above are intended to be illustrative only and are not intended to limit the scope of the following claims.

I claim:

1. In equipment for use in washing or otherwise handling eggs embodying two spaced parallel supports, a conveyor embodying two parallel chains movable along said supports, a plurality of rods connected to said chains and extending in parallel relation transversely to the direction of movement of said conveyor, the improvement comprising molded plastic spool-like members surrounding said rods and each including a tubular central portion bearing against a rod and having a plurality of integrally formed radially extending circular egg supporting fins projecting outwardly from said central portion and lying in parallel planes extending in the direction of movement of the conveyor.

2. Equipment as defined in claim 1 wherein said adjacent fins on said tubular element are of diffrent diameter and those fins of smaller diameter on the spool-like members on adjacent rods are positioned opposite to each other and cooperate to define egg receiving recesses on said conveyor.

3. A conveyor as defined in claim 2 wherein means are provided for rotating said spool-like members and eggs supported on the fins thereof.

* * * * *